UNITED STATES PATENT OFFICE.

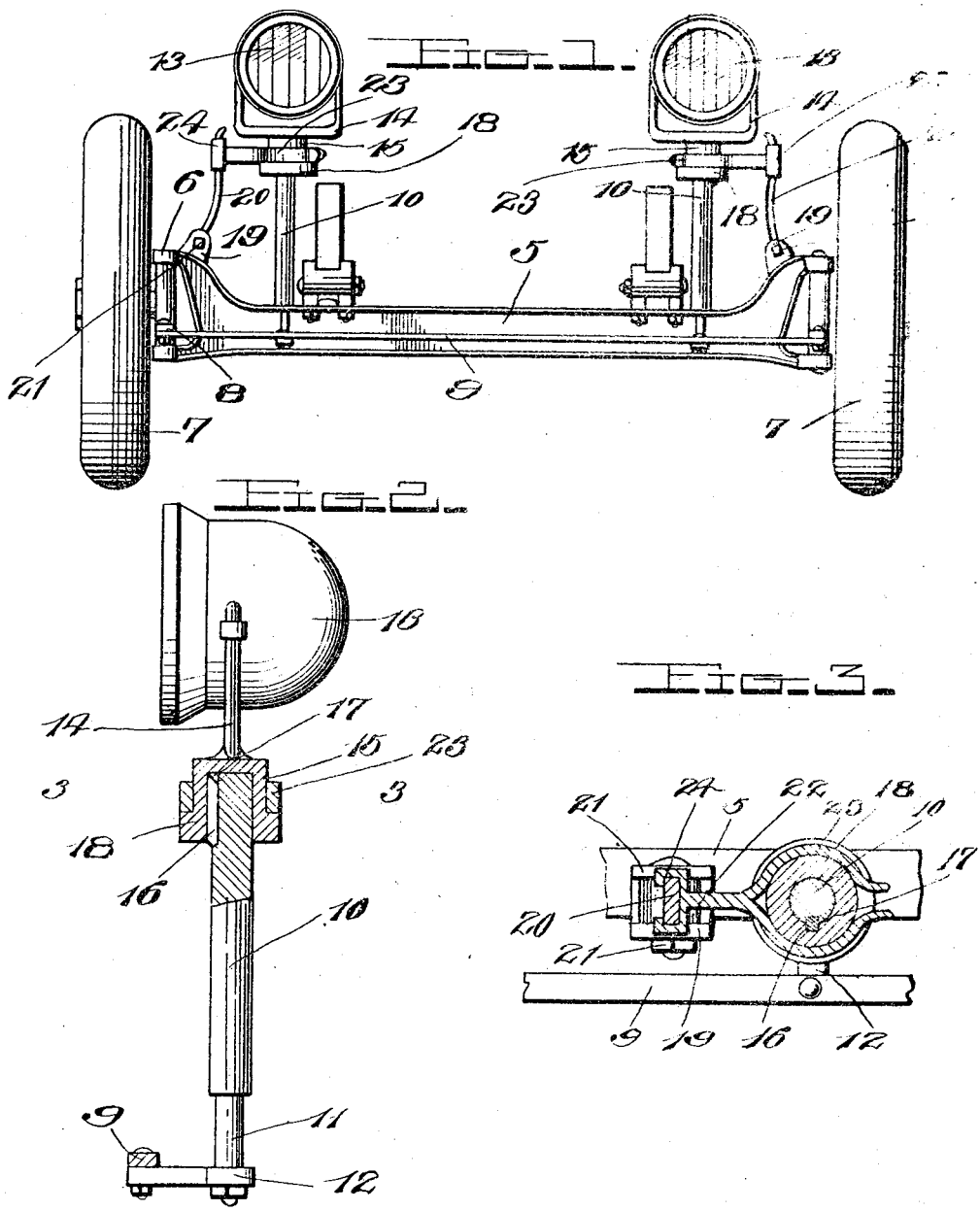

THOMAS G. WILBRAHAM, OF ALLOWAY, NEW JERSEY.

DIRIGIBLE AUTOMOBILE-LAMP.

1,025,602.

Specification of Letters Patent. Patented May 7, 1912.

Application filed January 6, 1912. Serial No. 669,849.

*To all whom it may concern:*

Be it known that I, THOMAS G. WILBRAHAM, a citizen of the United States, residing at Alloway, in the county of Salem and State of New Jersey, have invented certain new and useful Improvements in Dirigible Automobile-Lamps, of which the following is a specification, reference being had to the accompanying drawings.

This invention relates to dirigible automobile lamps and has for its primary object the provision of simple and effective means connected to the steering gearing and operated thereby for turning the lamps of the vehicle as the wheels are turned so that the light rays will at all times be thrown directly in front of the machine.

A further object of the invention is to provide improved means for removably mounting the lamps and securely retaining the same in their proper positions to be actuated by the operating mechanism.

Still another object of the invention is to provide mechanism for the above purpose which is simple and efficient in construction, highly durable in practical use and may be manufactured at comparatively small cost.

With the above and other objects in view, the invention consists of the novel features of construction, combination and arrangement of parts hereinafter fully described and claimed, and illustrated in the accompanying drawings, in which—

Figure 1 is a front elevation illustrating the arrangement of my improved mechanism; Fig. 2 is an enlarged detail section of one of the lamp supporting standards, showing the manner of mounting and retaining the lamp thereon; and Fig. 3 is a detail section taken on the line 3—3 of Fig. 2.

Referring in detail to the drawing 5 designates the axle of a motor driven vehicle upon the ends of which the usual steering knuckles 6 are arranged which carry spindles on which are mounted the vehicle wheels 7. Laterally extending arms 8 are connected to the steering knuckles and a transversely disposed steering rod 9 connects said arms.

Upon the vehicle axle 5 and adjacent to each of its ends a standard 10 is mounted, the lower end of said standard being seated in a recess in the axle and provided with a reduced portion 11 extending below said axle. Arms 12 are fixed upon these reduced lower ends of the standards 10 and are pivotally connected to the steering rod 9. Upon the upper end of each of the standards 10 a lamp 13 is mounted, said lamps being arranged in a holder consisting of the spaced arms 14 which are integrally formed upon a tubular body 15. Upon the inner wall of this tubular body a key 16 is formed to fit into a key-way 17 provided in the upper end of the standard 10. An annular flange 18 is formed upon the lower end of said tubular body. Adjacent to each of the standards 10 a pair of ears or lugs 19 are fixed upon the axle 5 and between these lugs the lower end of a resilient bar 20 is arranged and rigidly fixed by means of a bolt 21 extending through and connecting said lugs. A retaining member 22 is provided with bowed resilient arms 23 to embrace the body portion 15 of the lamp holder. This retaining member also includes a loop 24 to receive the upper end of the resilient bar 20. This bar 20 normally exerts pressure upon the retaining member in the direction of the standard 10 whereby the bowed arms 23 are retained in engagement about the body 15 of the holder and upon the annular flange 23 on the lower end thereof, thereby effectually preventing any lifting or upward movement of the holder off of the end of the standard.

From the foregoing construction, it will be readily seen that when the steering mechanism is operated to turn the forward vehicle wheel 7 in either direction, such turning movement is also transmitted to the lamp supporting standards 10 through the medium of the steering rod 9 which is connected to the lower ends of said standards by the arms 12. In this manner the light rays are at all times thrown upon the ground directly in front of the vehicle and the liability of accidents upon turning a corner is thereby reduced to a minimum. The lamps may be easily and quickly removed from the standards by simply forcing outwardly upon the upper end of the resilient bar 20 so that the bowed spring arms 23 of the retaining member 22 are disengaged from the body of the lamp holder. The holder and the lamp can then be readily lifted from the upper end of the standard.

From the foregoing the construction and manner of operation of my improved lamp turning mechanism will be fully understood.

But few parts are employed in the construction, which are of simple form, thereby rendering the mechanism very durable in use. By removably mounting the lamps, they can be quickly removed or replaced without disturbing the other parts of the mechanism, or requiring the removal of numerous bolts and similar fastening devices.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. A mechanism of the character described comprising rotatably mounted standards, a steering rod and connections between the lower ends of said standards, a lamp removably mounted upon the upper end of each of the standards and including a holder provided with an annular flange, a retaining member having resilient bowed arms to embrace said holder above said flange, and additional means engaging said retaining element and yieldingly holding the same in its effective position.

2. A mechanism of the character described comprising rotatably mounted standards, a steering rod and connections between the same and said standards, a lamp removably mounted upon the upper end of each of the standards, said lamps each including a holder having a tubular body portion and a key formed thereon, the upper end of the standard being provided with a key-way to receive said key, the lower end of said body being provided with an annular flange, a retaining member engaging said body above the flange, and a resilient rod engaging said retaining member to hold the same in its effective position upon the body of the holder.

3. A mechanism of the character described comprising rotatable supporting standards, a steering rod and connections between the same and the lower ends of the standards, a lamp mounted upon the upper end of each of the standards and including a holder provided with a tubular body portion to receive the standard, said body being provided with a key to be received in a key-way in said standard, a retaining member having bowed resilient arms to engage the holder and retain the same upon the standard, said member also including a loop, and a resilient bar rigidly fixed at one end and having its other end disposed in said loop to yieldingly hold said retaining member in engagement with the lamp holder.

In testimony whereof I hereunto affix my signature in the presence of two witnesses.

THOMAS G. WILBRAHAM.

Witnesses:
D. HARRIS SMITH,
C. H. WARNER.